United States Patent
Zhao et al.

(10) Patent No.: US 9,124,764 B2
(45) Date of Patent: Sep. 1, 2015

(54) METHOD, DEVICE AND SYSTEM FOR ADJUSTING IMAGE DISPLAY

(71) Applicant: Huawei Technologies Co., Ltd., Shenzhen (CN)

(72) Inventors: Guangyao Zhao, Shenzhen (CN); Jing Wang, Shenzhen (CN); Yuan Liu, Shenzhen (CN); Baohua Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 14/138,541

(22) Filed: Dec. 23, 2013

(65) Prior Publication Data

US 2014/0111602 A1   Apr. 24, 2014

Related U.S. Application Data

(63) Continuation of application No. PCT/CN2012/078668, filed on Jul. 16, 2012.

(30) Foreign Application Priority Data

Nov. 8, 2011   (CN) .......................... 2011 1 0350429

(51) Int. Cl.
    *H04N 7/14*    (2006.01)
    *H04N 7/15*    (2006.01)
    *H04N 9/67*    (2006.01)

(52) U.S. Cl.
    CPC ... *H04N 7/15* (2013.01); *H04N 9/67* (2013.01)

(58) Field of Classification Search
    USPC ................... 348/14.01, 14.08, 14.12
    See application file for complete search history.

(56) References Cited

U.S. PATENT DOCUMENTS

| | | | |
|---|---|---|---|
| 7,924,305 | B2 | 4/2011 | Thielman et al. |
| 2004/0130614 | A1 | 7/2004 | Valliath et al. |
| 2011/0181685 | A1 | 7/2011 | Saleh et al. |
| 2012/0224019 | A1* | 9/2012 | Samadani et al. ......... 348/14.01 |

(Continued)

FOREIGN PATENT DOCUMENTS

| | | |
|---|---|---|
| CN | 1832569 A | 9/2006 |
| CN | 101340546 A | 1/2009 |

(Continued)

OTHER PUBLICATIONS

International Search Report received in PCT/CN2012/078668, mailed Oct. 4, 2012, 11 pgs.

(Continued)

*Primary Examiner* — Olisa Anwah
(74) *Attorney, Agent, or Firm* — Slater & Matsil, L.L.P.

(57) ABSTRACT

The present invention discloses a method, a device, and a system for adjusting image display and belongs to the field of videoconferencing technologies. The method includes: receiving an image of a second conference site and an environmental parameter of the second conference site that are sent by a presence terminal of the second conference site; converting the image of the second conference site according to a pre-stored environmental parameter of a first conference site and the environmental parameter of the second conference site to obtain an image for display, wherein a conference site environmental parameter of the image for display is consistent with the environmental parameter of the first conference site; and displaying the image for display.

20 Claims, 5 Drawing Sheets

```
┌─────────────────────────────────────────────────────┐        101
│ Receive an image of a second conference site and an │       ╱
│ environmental parameter of the second conference    │◄─────
│ site that are sent by a presence terminal of the    │
│ second conference site                              │
└─────────────────────────────────────────────────────┘
                            │
                            ▼
┌─────────────────────────────────────────────────────┐        102
│ Convert the image of the second conference site     │       ╱
│ according to a prestored environmental parameter of │
│ a first conference site and the environmental       │◄─────
│ parameter of the second conference site to obtain a │
│ first image to be displayed that is consistent with │
│ the environmental parameter of the first conference │
│ site                                                │
└─────────────────────────────────────────────────────┘
                            │                                  103
                            ▼                                 ╱
┌─────────────────────────────────────────────────────┐
│ Display the first image to be displayed             │◄─────
└─────────────────────────────────────────────────────┘
```

(56) References Cited

U.S. PATENT DOCUMENTS

2012/0293603 A1    11/2012    Wang
2012/0320144 A1*   12/2012    Samadani et al. ......... 348/14.08

FOREIGN PATENT DOCUMENTS

| CN | 101778246 A | 7/2010 |
| CN | 102006449 A | 4/2011 |
| EP | 1906673 A1  | 4/2008 |
| EP | 1959691 A1  | 8/2008 |
| EP | 2521351 A1  | 11/2012 |

OTHER PUBLICATIONS

"3D Lookup Table," Sep. 26, 2011, Wikepedia, retrieved from the Internet: URL:http://en.wikepedia.org/w/index.php?title=3D_lookup_table&oldid=452446818, retrieved on Mar. 4, 2015, 3 pages.

AVD-4092 Study Group 16, "Telecommunication Standardization Sector" Rapporteur Meeting Document, Andover, MA, USA, Jul. 18-22, 2011, 10 pgs.

* cited by examiner

METHOD, DEVICE AND SYSTEM FOR ADJUSTING IMAGE DISPLAY

This application is a continuation of International Application No. PCT/CN2012/078668, filed Jul. 16, 2012, which claims priority to Chinese Patent Application No. 201110350429.X, filed Nov. 8, 2011, both of which are hereby incorporated by reference in their entireties.

TECHNICAL FIELD

The present invention relates to the field of videoconferencing technologies, and in particular embodiments, to a method, a device, and a system for adjusting image display.

BACKGROUND

With rapid development of IP (Internet Protocol) networks, videoconferencing systems, telepresence videoconferencing systems (telepresence systems for short) in particular, are widely used. For example, many departments of governments, armed forces, enterprises, and others, have deployed their own telepresence systems to improve conference efficiency and reduce conference costs.

A telepresence system allows an image of a participant at another end of a network to be displayed on a local display device in true-to-life dimensions. Additionally, the telepresence system also has characteristics such as an image display effect with ultra-high definition, an audio system with a sense of space, and combined with an environment. This builds a sense that a local participant and a remote participant are in one conference room, overcomes plane sense and unreal feelings problems of a conventional video conference, makes a conference more natural, and improves conference efficiency.

A light source in a conference environment has a certain impact on a conference effect of the telepresence system. This is because the light source affects human vision. For example, the higher the color temperature of the light source is, the bluer an image is in people's eyes, and the lower the color temperature of the light source is, the redder an image is in people's eyes; the higher the light intensity of the light source is, the brighter an image is in people's eyes, and the lower the light intensity of the light source is, the darker an image is in people's eyes; and the like. As a result, in a situation in which different light sources are used in different conference sites, a certain difference exists between an image that is displayed by the telepresence system and watched by people and a local image, and therefore a conference affinity is reduced.

For the purpose of compensating for a difference between a remote image displayed by the telepresence system and a local image, a light source in a local conference site environment is adaptively adjusted in the prior art, so that the light source in the local conference site is consistent with that in a remote conference site.

However, the prior art has the following problems: 1) Frequent adjustment of a light source will shorten the life time of the light source; and 2) when a display device of a local conference site displays images of multiple remote conference sites and light sources in multiple conference site environments are different, adjustment of the light sources will become complicated and cannot be accurately controlled, and it is difficult to obtain a satisfactory adjustment effect.

SUMMARY OF THE INVENTION

For the purpose of compensating for a difference between a remote image displayed by a telepresence system and a local image, embodiments of the present invention provide a method, a device, and a system for adjusting image display. The technical solutions are as follows.

One embodiment provides a method for adjusting image display, including: receiving an image of a second conference site and an environmental parameter of the second conference site that are sent by a presence terminal of the second conference site, converting the image of the second conference site according to a pre-stored environmental parameter of a first conference site and the environmental parameter of the second conference site to obtain an image for display, wherein a conference site environmental parameter of the image for display is consistent with the environmental parameter of the first conference site, and displaying the image for display.

Another embodiment provides a method for adjusting image display, including: acquiring an image of a first conference site, converting the image of the first conference site according to a pre-stored environmental parameter of the first conference site and an environmental parameter of a second conference site to obtain an image for display, wherein a conference site environmental parameter of the image for display is consistent with the environmental parameter of the second conference site, and sending the image for display to a presence terminal of the second conference site for display.

Yet another embodiment provides a conference site presence terminal, including: a receiver configured to receive an image of a second conference site and an environmental parameter of the second conference site, sent by a presence terminal of the second conference site; a processor configured to convert the image of the second conference site according to a pre-stored environmental parameter of a first conference site and the environmental parameter of the second conference site to obtain an image for display, wherein a conference site environmental parameter of the image for display is consistent with the environmental parameter of the first conference site; and a screen configured to display the image for display.

Yet another embodiment provides an apparatus for adjusting image display, including: a catcher configured to acquire an image of a first conference site; a conversion processor configured to convert the image of the first conference site according to a pre-stored environmental parameter of the first conference site and an environmental parameter of a second conference site to obtain an image for display, wherein a conference site environmental parameter of the image for display is consistent with the environmental parameter of the second conference site; and a transmitter configured to send the image for display toward a presence terminal of the second conference site for display.

Yet another embodiment provides a system for adjusting image display, including: a presence terminal of a first conference site; and a presence terminal of a second conference site configured to capture an image of the second conference site and send the captured image of the second conference site and a pre-stored environmental parameter of the second conference site to the presence terminal of the first conference site, wherein the presence terminal of the first conference site is configured to: receive the image of the second conference site and the environmental parameter of the second conference site, convert the image of the second conference site according to a pre-stored environmental parameter of the first conference site and the environmental parameter of the second conference site to obtain an image for display, wherein a conference site environmental parameter of the image for display is consistent with the environmental parameter of the first conference site, and display the first image to be displayed.

Another embodiment provides a system for adjusting image display, including: a presence terminal of a second conference site configured to display an image for display; and a presence terminal of a first conference site configured to: acquire an image of the first conference site, convert the image of the first conference site according to a pre-stored environmental parameter of the first conference site and an environmental parameter of the second conference site to obtain an image for display, wherein a conference site environmental parameter of the image for display is consistent with the environmental parameter of the second conference site, and send the image for display to the presence terminal of the second conference site.

Yet another embodiment provides a system for adjusting image display, including: a presence terminal of a second conference site configured to display an image for display; a presence terminal of a first conference site configured to capture an image of the first conference site; and a remote processing device configured to: receive the image of the first conference site from the presence terminal of the first conference site, convert the image of the first conference site according to a pre-stored environmental parameter of the first conference site and an environmental parameter of the second conference site to obtain an image for display, wherein a conference site environmental parameter of the image for display is consistent with the environmental parameter of the second conference site, and send the image for display to the presence terminal of the second conference site.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Through implementation of the technical solution of receiving an image of a second conference site and an environmental parameter of the second conference site that are sent by a presence terminal of the second conference site, converting the image of the second conference site according to a pre-stored environmental parameter of a first conference site and the environmental parameter of the second conference site to obtain a first image to be displayed, wherein a conference site environmental parameter of the first image to be displayed is consistent with the environmental parameter of the first conference site, and displaying the first image to be displayed, the problem that an image displayed in the first conference site is inconsistent with an environment of the first conference site, which is caused by an inconsistency between an environmental parameter in the environment of the first conference site and that in an environment of the second conference site, can be solved without changing illumination in the environment of the first conference site, thereby providing users with better "immersion" experience, ensuring that the environment of the first conference site is consistent with that of the second conference site in a videoconferencing process, making a video conference more natural, and further improving the efficiency of the video conference.

In addition, through implementation of the technical solution of acquiring an image of a first conference site, converting the image of the first conference site according to a pre-stored environmental parameter of the first conference site and an environmental parameter of a second conference site to obtain a second image to be displayed, wherein a conference site environmental parameter of the second image to be displayed is consistent with the environmental parameter of the second conference site, and sending the second image to be displayed to a presence terminal of the second conference site, so that the presence terminal of the second conference site displays the second image to be displayed, the problem that an implementation condition of an image displayed in the second conference site is inconsistent with an environment of the second conference site, which is caused by an inconsistency between an environmental parameter of the second conference site and that of the first conference site, can be solved without changing illumination in the environment of the second conference site, thereby providing users with better "immersion" experience, ensuring that the environment of the second conference site is consistent with that of the first conference site in a videoconferencing process, making a video conference more natural, and further improving the efficiency of the video conference.

Figure 1:
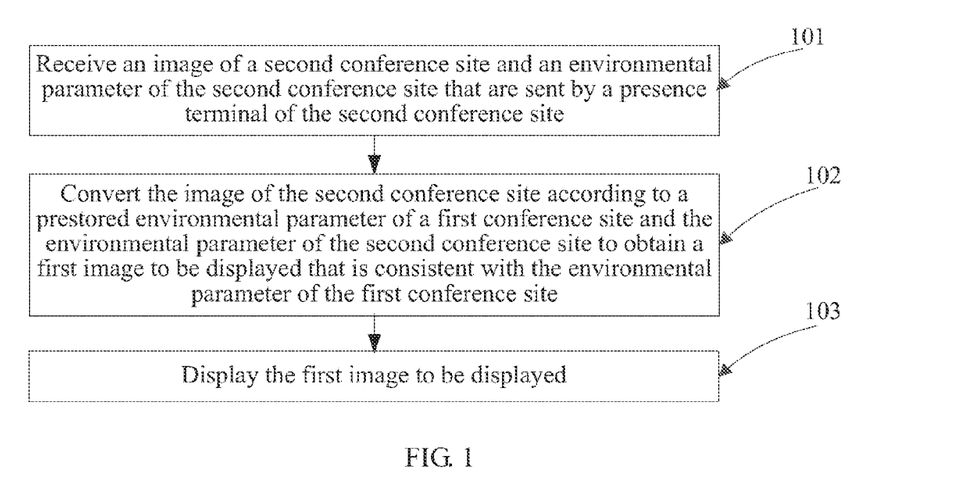
FIG. 1 is a flowchart of one embodiment of a method for adjusting image display.

FIG. 1 is a flowchart of one embodiment of a method for adjusting image display. The method for adjusting image display includes the following steps. Step 101: Receive an image of a second conference site and an environmental parameter of the second conference site that are sent by a presence terminal of the second conference site. Step 102: Convert the image of the second conference site according to a pre-stored environmental parameter of a first conference site and the environmental parameter of the second conference site to obtain a first image to be displayed that is consistent with the environmental parameter of the first conference site. Step 103: Display the first image to be displayed.

Figure 2:
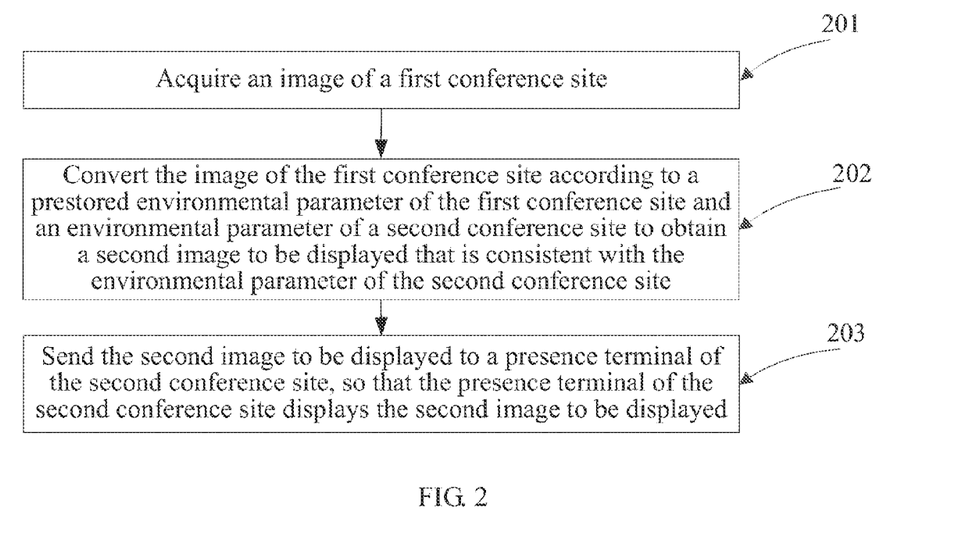
FIG. 2 is a flowchart of another embodiment of a method for adjusting image display.

FIG. 2 is a flowchart of another embodiment of a method for adjusting image display. The method for adjusting image display includes the following steps. Step 201: Acquire an image of a first conference site. Step 202: Convert the image of the first conference site according to a pre-stored environmental parameter of the first conference site and an environmental parameter of a second conference site to obtain a second image to be displayed that is consistent with the environmental parameter of the second conference site. Step 203: Send the second image to be displayed to a presence terminal of the second conference site, so that the presence terminal of the second conference site displays the second image to be displayed.

Certain embodiments include method for adjusting image display to solve the problem that a conference site environment is inconsistent with a displayed image without changing illumination in a conference site. Specifically, conference site environmental parameters are set for conference sites, and the conference site environmental parameters represent illumination characteristics in the conference sites; then, a conference site image of a remote conference site is processed according to a conference site environmental parameter of a local conference site and a conference site environmental parameter of the remote conference site, so that the conference site image of the remote conference site, when displayed at the local conference site, is consistent with a conference site illumination characteristic represented by the conference site environmental parameter of the local conference site; or, a conference site image of a local conference site is processed according to a conference site environmental parameter of the local conference site and a conference site environmental parameter of a remote conference site, so that the conference site image of the local conference site, when displayed at the remote conference site, is consistent with a conference site illumination characteristic represented by the conference site environmental parameter of the remote conference site.

In these embodiments, in a same telepresence videoconferencing system, a local conference site is collectively called a first conference site, and a remote conference site is collectively called a second conference site. The following describes in detail the method for adjusting image display with reference to a specific embodiment.

Figure 3:
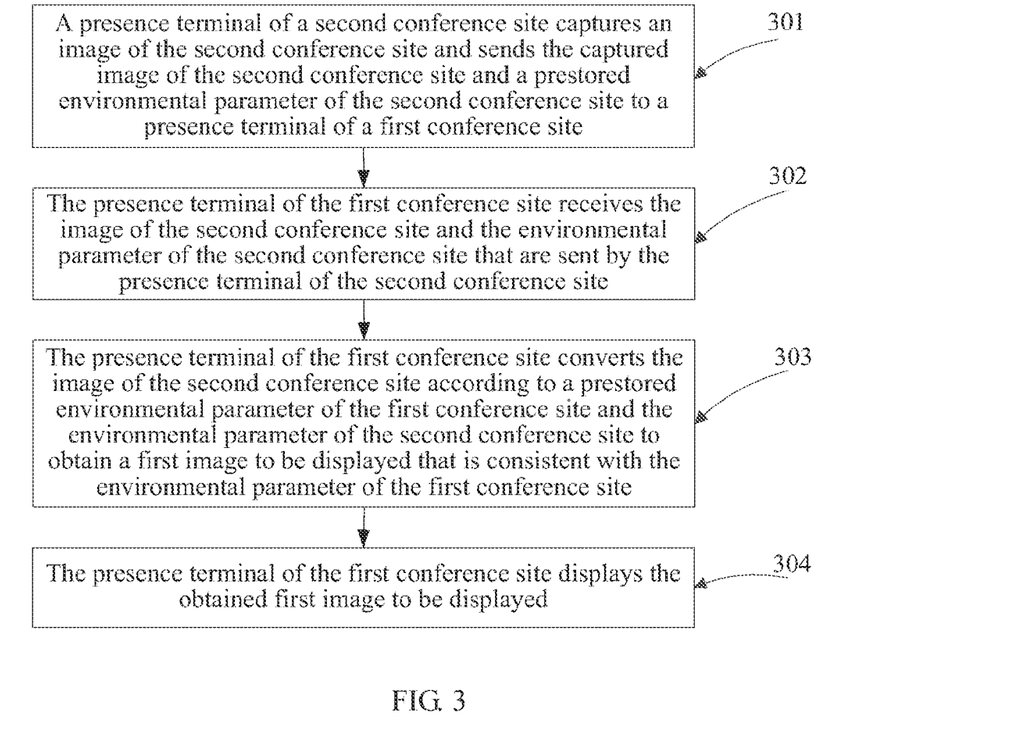
FIG. 3 is a flowchart of yet another embodiment of a method for adjusting image display.

FIG. 3 is a flowchart of one embodiment of a method of adjusting image display. The method includes the following steps. Step 301: A presence terminal of a second conference site captures an image of the second conference site and sends the captured image of the second conference site and a pre-stored environmental parameter of the second conference site to a presence terminal of a first conference site.

In this embodiment, during deployment of a telepresence videoconferencing system, when deploying the presence terminal of the second conference site, deployment personnel set a corresponding environmental parameter of the second conference site in the presence terminal of the second conference site according to an illumination condition in the second conference site. Specifically, the environmental parameter of the second conference site at least includes information about a light source type. Certainly, during specific implementation, the environmental parameter of the second conference site may further include information such as a color rendering index and a color temperature.

For example, the environmental parameter of the second conference site is F541, and the parameter represents that the light source type of an environment of the second conference site is a fluorescent lamp, the color rendering index is 50 to 59, and the color temperature is 4,100 K; or the environmental parameter of the second conference site is F865, and the parameter represents that the light source type of the second conference site is a fluorescent lamp, the color rendering index is 80 to 89, and the color temperature is 6,500 K; that is, in the environmental parameter, F represents that the light source type is a fluorescent lamp, a unit of the color rendering index is 10, and a unit of the color temperature is 100 K.

In addition, if a light source of the environment of the second conference site is a standard light source stipulated by the CIE (Commission Internationale de L'Eclairage, Commission Internationale de L'Eclairage), values of the color temperature and the color rendering index can be obtained only according to the light source type of the standard light source stipulated by the CIE. Therefore, in this situation, the environmental parameter of the second conference site may include only the information about the light source type. For example, the environmental parameter of the second conference site is A, and the parameter represents that the color temperature of the environment of the second conference site is 2,856 K, the color rendering index is greater than 95, and the light source type is an incandescent lamp.

In addition, it should be noted that, in a process of establishing a call connection with the presence terminal of the first conference site, the presence terminal of the second conference site may send the pre-stored environmental parameter of the second conference site to the presence terminal of the first conference site, so that when sending the image of the second conference site, the presence terminal of the second conference site may not need to send the environmental parameter of the second conference site to the presence terminal of the first conference site.

Here, the presence terminal of the second conference site may send the environmental parameter of the second conference site to the presence terminal of the first conference site and may further send the environmental parameter of the second conference site to conference site presence terminals of all other conference sites that participate in a current telepresence video conference or to a conference site presence terminal of a specified conference site that participates in the current telepresence video conference.

Step 302: The presence terminal of the first conference site receives the image of the second conference site and the environmental parameter of the second conference site that are sent by the presence terminal of the second conference site.

In this embodiment of the present invention, the presence terminal of the first conference site stores the received environmental parameter of the second conference site. In this way, in a process of subsequent interaction between the presence terminal of the second conference site and the presence terminal of the first conference site, the presence terminal of the second conference site does not need to send the environmental parameter of the second conference site to the presence terminal of the first conference site again; and when needing to use the environmental parameter of the second conference site, the presence terminal of the first conference site may directly use the stored environmental parameter of the second conference site. This can reduce the load of information bearing between the presence terminal of the first conference site and the presence terminal of the second conference site, thereby increasing a speed of information interaction between the presence terminal of the first conference site and the presence terminal of the second conference site to a certain extent.

Certainly, when the environmental parameter of the second conference site changes, the presence terminal of the second conference site re-sends the changed environmental parameter of the second conference site to the presence terminal of the first conference site; and after receiving the changed environmental parameter of the second conference site, the presence terminal of the first conference site updates its stored environmental parameter of the second conference site according to the changed environmental parameter of the second conference site, thereby ensuring that the environmental parameter of the second conference site that is stored by the presence terminal of the first conference site is consistent with an illumination characteristic of the environment of the second conference site.

Step 303: The presence terminal of the first conference site converts the image of the second conference site according to a pre-stored environmental parameter of the first conference site and the environmental parameter of the second conference site to obtain a first image to be displayed that is consistent with the environmental parameter of the first conference site.

Specifically, information about an image conversion coefficient is looked up according to the pre-stored environmental parameter of the first conference site and the environmental parameter of the second conference site.

When a corresponding image conversion coefficient for converting the environmental parameter of the second conference site into the environmental parameter of the first conference site is obtained by looking up the information about the image conversion coefficient, the image of the second conference site is converted, according to the image conversion coefficient, into the first image to be displayed that is consistent with the environmental parameter of the first conference site.

In this embodiment of the present invention, during the deployment of the telepresence videoconferencing system, when deploying the presence terminal of the first conference site, the deployment personnel set the environmental parameter of the first conference site in the presence terminal of the first conference site according to an illumination condition in the first conference site. Specifically, the environmental parameter of the first conference site at least includes information about a light source type. Certainly, during specific implementation, the environmental parameter of the first conference site may further include information such as a color temperature and a color rendering index.

For example, the environmental parameter of the first conference site is F541, and the parameter represents that the light source type of an environment of the first conference site is a fluorescent lamp, the color rendering index is 50 to 59, and the color temperature is 4,100 K; or the environmental parameter of the first conference site is F865, and the parameter represents that the light source type of the environment of the first conference site is a fluorescent lamp, the color rendering index is 80 to 89, and the color temperature is 6,500 K.

In this embodiment of the present invention, the information about the image conversion coefficient is pre-stored in the presence terminal of the first conference site. The information about the image conversion coefficient may be set in the presence terminal of the first conference site at delivery of the presence terminal of the first conference site, or the information about the image conversion coefficient may be set in the presence terminal of the first conference site during deployment of the presence terminal of the first conference site.

The information about the image conversion coefficient includes an image conversion coefficient corresponding for converting the environmental parameter of the first conference site into the environmental parameter of the second conference site, and the image conversion coefficient for converting the environmental parameter of the second conference site into the environmental parameter of the first conference site. Specifically, the image conversion coefficient may include information such as a color transformation matrix, for example, a transformation matrix on RGB color space, a transformation matrix on RGB to YUV (Y is a brightness signal of an image, U is a color difference signal indicating a tendency to red of an image, and V is a color difference signal indicating a tendency to blue of an image) color space, and the like, RGB/YUV gains, a 3D-LUT (three-dimensional color space interpolation) lookup table, a Gamma table, and a white balance parameter or a black balance parameter.

For example, when the image conversion coefficient corresponding to the conversion from the environmental parameter of the second conference site into the environmental parameter of the first conference site is a color transformation matrix, a terminal of the first conference site is capable of converting, according to the color transformation matrix, the image of the second conference site into the first image to be displayed that is consistent with the environmental parameter of the first conference site. A specific method is multiplying the color transformation matrix by a color value of each pixel in the image of the second conference site to obtain the first image to be displayed. A specific calculation formula is as follows:

$$C' = M_{3 \times 3} C$$

C' is a color of a pixel in the first image to be displayed that is obtained after transformation, and it is a column vector including R, G, and B color values; C is a color of a pixel corresponding to the image of the second conference site before transformation; and $M_{3 \times 3}$ is a 3×3 transformation matrix on RGB color space.

Specifically, $M_{3 \times 3}$ may be pre-generated and stored in the presence terminal of the first conference site according to the environmental parameter of the first conference site and the environmental parameter of the second conference site. For example, through an experimental method, images $I_1$ and $I_2$ of a color template (for example, a Macbeth color card including 24 colors) are shot in conference site conditions of the environmental parameter of the first conference site and the environmental parameter of the second conference site, respectively. Then, corresponding color sets $S_1$ and $S_2$ are sampled from $I_1$ and $I_2$, respectively, and the color sets include colors of multiple sampling points/areas. A transformation matrix of the two color sets, that is, a color transformation matrix corresponding to mutual conversion between the environmental parameter of the first conference site and the environmental parameter of the second conference site, may be calculated by using corresponding sampled colors of the color sets $S_1$ and $S_2$ and using a preset algorithm (for example, the least square method). The technology for obtaining the color transformation matrix is the prior art, and therefore no further details are provided herein.

For example, when the image conversion coefficient corresponding to the conversion from the environmental parameter of the second conference site into the environmental parameter of the first conference site is a three-dimensional color space interpolation lookup table, the terminal of the first conference site is capable of converting, according to the three-dimensional color space interpolation lookup table, the image of the second conference site into the first image to be displayed that corresponds to the environmental parameter of the first conference site. The details are as follows:

obtaining an output color value corresponding to a color value of each pixel in the image of the second conference site according to the three-dimensional color space interpolation lookup table, where the output color value corresponding to the color value of each pixel in the image of the second conference site forms the first image to be displayed that is consistent with the environmental parameter of the first conference site, where:

the obtaining an output color value corresponding to a color value of each pixel in the image of the second conference site according to the three-dimensional color space interpolation lookup table includes: successively using the color value of each pixel in the image of the second conference site as a color value of a current pixel to be looked up to perform the following operations:

looking up the three-dimensional color space interpolation lookup table according to the color value of the current pixel to be looked up; and when an output color value corresponding to the color value of the current pixel to be looked up fails to be obtained by looking up the three-dimensional color space interpolation lookup table, calculating and obtaining, by using an interpolation algorithm according to multiple output color values adjacent to the color value of the current pixel to be looked up in the three-dimensional color space interpolation lookup table, an output color value corresponding to the color value of the current pixel to be looked up.

The used interpolation algorithm may be an algorithm such as a three-dimensional linear interpolation or three-dimensional Bessel interpolation algorithm.

Here, a method for generating a three-dimensional color space interpolation lookup table is similar to a method for generating a color transformation matrix; through an experimental method, an image of a color template may be shot in conference site conditions of the environmental parameter of the first conference site and the environmental parameter of the second conference site, respectively, and then a three-dimensional color space interpolation lookup table is generated by using a color set obtained through sampling.

Step 304: The presence terminal of the first conference site displays the obtained first image to be displayed.

Specifically, the first image to be displayed may be displayed on one or more screens of the presence terminal of the first conference site.

Figure 4:
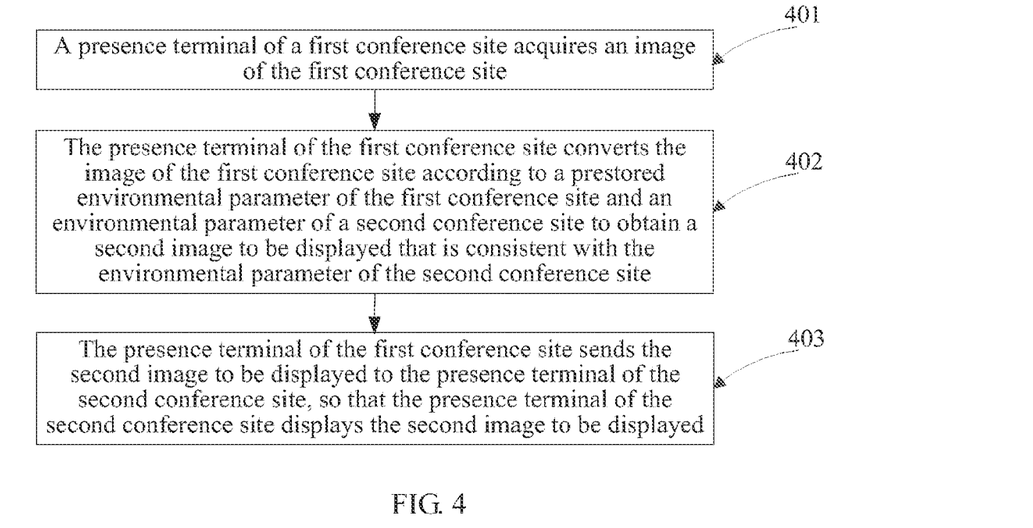
FIG. 4 is a flowchart of yet another method for adjusting image display.

FIG. 4 is a flowchart of yet another embodiment of a method of adjusting image display. The method includes the following steps. Step 401: A presence terminal of a first conference site acquires an image of the first conference site; specifically, a camera device in the presence terminal of the first conference site captures the image of the first conference site. Step 402: The presence terminal of the first conference site converts the image of the first conference site according to a pre-stored environmental parameter of the first conference site and an environmental parameter of a second conference site to obtain a second image to be displayed that is consistent with the environmental parameter of the second conference site.

During deployment of a telepresence videoconferencing system, when deploying the presence terminal of the first conference site, deployment personnel set a corresponding environmental parameter of the first conference site in the presence terminal of the first conference site according to an illumination condition in the first conference site. Specifically, the environmental parameter of the first conference site at least includes information about a light source type. Certainly, during specific implementation, the environmental parameter of the first conference site may further include information such as a color temperature and a color rendering index.

For example, the environmental parameter of the first conference site is F541, and the parameter represents that the light source type of an environment of the first conference site is a fluorescent lamp, the color rendering index is 50 to 59, and the color temperature is 4,100 K; or the environmental parameter of the first conference site is F865, and the parameter represents that the light source type of the environment of the first conference site is a fluorescent lamp, the color rendering index is 80 to 89, and the color temperature is 6,500 K.

In addition, if a light source of the environment of the first conference site is a standard light source stipulated by the CIE (Commission Internationale de L'Eclairage), values of the color temperature and the color rendering index can be obtained only according to the light source type of the standard light source stipulated by the CIE. Therefore, in this situation, the environmental parameter of the first conference site may include only the information about the light source type. For example, the environmental parameter of the first conference site is A, and the parameter represents that the color temperature of the environment of the first conference site is 2,856 K, the color rendering index is greater than 95, and the light source type is an incandescent lamp.

Here, in a process in which the presence terminal of the first conference site establishes a call connection with a presence terminal of the second conference site, the presence terminal of the second conference site sends its stored environmental parameter of the second conference site to the presence terminal of the first conference site, and the presence terminal of the first conference site saves the received environmental parameter of the second conference site.

During the deployment of the telepresence videoconferencing system, when deploying the presence terminal of the second conference site, the deployment personnel set a corresponding environmental parameter of the second conference site in the presence terminal of the second conference site according to an illumination condition in the second conference site. Specifically, the environmental parameter of the second conference site at least includes information about a light source type. Certainly, during specific implementation, the environmental parameter of the second conference site may further include information such as a color rendering index and a color temperature.

Specifically, the converting, by the presence terminal of the first conference site, the image of the first conference site according to a pre-stored environmental parameter of the first conference site and an environmental parameter of a second conference site to obtain a second image to be displayed that is consistent with the environmental parameter of the second conference site includes:

looking up information about an image conversion coefficient according to the environmental parameter of the first conference site and the environmental parameter of the second conference site; and when a corresponding image conversion coefficient for converting the environmental parameter of the first conference site into the environmental parameter of the second conference site is obtained by looking up the information about the image conversion coefficient, converting, according to the image conversion coefficient, the image of the first conference site into the second image to be displayed that is consistent with the environmental parameter of the second conference site.

The information about the image conversion coefficient includes the image conversion coefficient for converting the environmental parameter of the first conference site into the environmental parameter of the second conference site, and an image conversion coefficient for converting the environmental parameter of the second conference site into the environmental parameter of the first conference site. Specifically, the image conversion coefficient may include information such as a color transformation matrix, for example, a transformation matrix on RGB color space, a transformation matrix on RGB to YUV (Y is a brightness signal of an image, U is a color difference signal indicating a tendency to red of an image, and V is a color difference signal indicating a tendency to blue of an image) color space, and the like, RGB/YUV gains, a 3D-LUT (three-dimensional color space interpolation) lookup table, a Gamma table, and a white balance parameter or a black balance parameter.

For example, when the image conversion coefficient is a color transformation matrix, the converting, according to the image conversion coefficient, the image of the first conference site into the second image to be displayed that is consistent with the environmental parameter of the second conference site includes: multiplying the color transformation matrix by a color value of each pixel in the image of the first conference site to obtain the converted second image to be displayed that is consistent with the environmental parameter of the second conference site. A specific calculation process is the same as the calculation manner of multiplying the color transformation matrix by a color value of each pixel in the image of the second conference site to obtain the first image to be displayed in step 303, detailed description about a method for acquiring the color transformation matrix is also provided in step 303, and therefore no further details are provided herein.

For example, when the image conversion coefficient is a three-dimensional color space interpolation lookup table, the converting, according to the image conversion coefficient, the image of the first conference site into the second image to be displayed that is consistent with the environmental parameter of the second conference site includes:

obtaining an output color value corresponding to a color value of each pixel in the image of the first conference site according to the three-dimensional color space interpolation lookup table, where the output color value corresponding to the color value of each pixel in the image of the first conference site forms the second image to be displayed that is consistent with the environmental parameter of the second conference site, where:

the obtaining an output color value corresponding to a color value of each pixel in the image of the first conference site according to the three-dimensional color space interpolation lookup table includes: successively using the color value of each pixel in the image of the first conference site as a color value of a current pixel to be looked up to perform the following operations:

looking up the three-dimensional color space interpolation lookup table according to the color value of the current pixel to be looked up; and when an output color value corresponding to the color value of the current pixel to be looked up fails to be obtained by looking up the three-dimensional color space interpolation lookup table, calculating and obtaining, by using an interpolation algorithm according to multiple output color values adjacent to the color value of the current pixel to be looked up in the three-dimensional color space interpolation lookup table, an output color value corresponding to the color value of the current pixel to be looked up.

The used interpolation algorithm may be an algorithm such as a three-dimensional linear interpolation or three-dimensional Bessel interpolation algorithm.

Here, a method for generating a three-dimensional color space interpolation lookup table is similar to a method for generating a color transformation matrix; through an experimental method, an image of a color template may be shot in conference site conditions of the environmental parameter of the first conference site and the environmental parameter of the second conference site, respectively, and then a three-dimensional color space interpolation lookup table is generated by using a color set obtained through sampling.

Step 403: The presence terminal of the first conference site sends the second image to be displayed to the presence terminal of the second conference site, so that the presence terminal of the second conference site displays the second image to be displayed.

Figure 5:
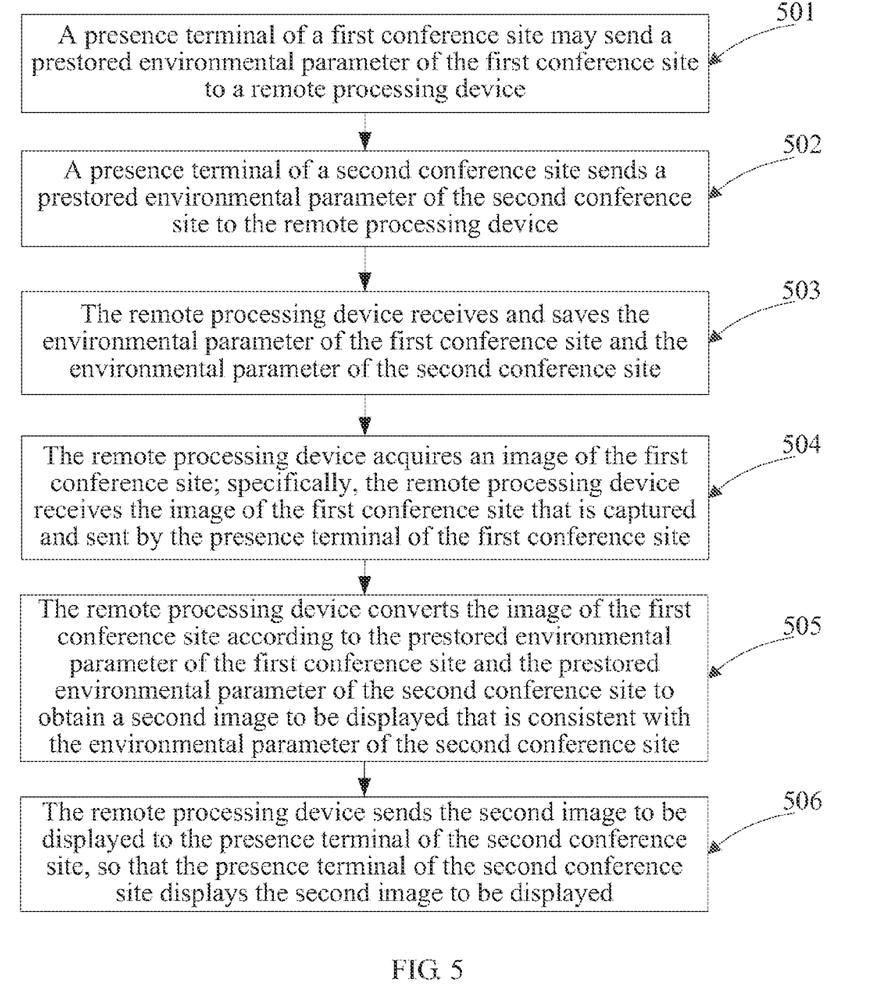
FIG. 5 is a flowchart of yet another method for adjusting image display.

FIG. 5 is a flowchart of yet another embodiment of a method of adjusting image display. The method includes the following steps. Step 501: A presence terminal of a first conference site may send a pre-stored environmental parameter of the first conference site to a remote processing device.

Specifically, in a process of establishing a call connection with the remote processing device, the presence terminal of the first conference site sends the environmental parameter of the first conference site to the remote processing device.

During deployment of a telepresence videoconferencing system, when deploying the presence terminal of the first conference site, deployment personnel set a corresponding environmental parameter of the first conference site in the presence terminal of the first conference site according to an illumination condition in the first conference site. Specifically, the environmental parameter of the first conference site at least includes information about a light source type. Certainly, during specific implementation, the environmental parameter of the first conference site may further include information such as a color temperature and a color rendering index.

For example, the environmental parameter of the first conference site is F541, and the parameter represents that the light source type of an environment of the first conference site is a fluorescent lamp, the color rendering index is 50 to 59, and the color temperature is 4,100 K; or the environmental parameter of the first conference site is F865, and the parameter represents that the light source type of the environment of the first conference site is a fluorescent lamp, the color rendering index is 80 to 89, and the color temperature is 6,500 K.

In addition, if a light source of the environment of the first conference site is a standard light source stipulated by the CIE (Commission Internationale de L'Eclairage, Commission Internationale de L'Eclairage), values of the color temperature and the color rendering index can be obtained only according to the light source type of the standard light source stipulated by the CIE. Therefore, in this situation, the environmental parameter of the first conference site may include only the information about the light source type. For example, the environmental parameter of the first conference site is A, and the parameter represents that the color temperature of the environment of the first conference site is 2,856 K, the color rendering index is greater than 95, and the light source type is an incandescent lamp.

Step 502: A presence terminal of a second conference site sends a pre-stored environmental parameter of the second conference site to the remote processing device.

During specific implementation, when establishing a call connection with the remote processing device, the presence terminal of the second conference site may send the environmental parameter of the second conference site to the remote processing device.

In this embodiment, during deployment of a telepresence videoconferencing system, when deploying the presence terminal of the second conference site, the deployment personnel set a corresponding environmental parameter of the second conference site in the presence terminal of the second conference site according to an illumination condition in the second conference site. Specifically, the environmental parameter of the second conference site at least includes information about a light source type. Certainly, during specific implementation, the environmental parameter of the second conference site may further include information such as a color rendering index and a color temperature.

For example, the environmental parameter of the second conference site is F541, and the parameter represents that the light source type of an environment of the second conference site is a fluorescent lamp, the color rendering index is 50 to 59, and the color temperature is 4,100 K; or the environmental parameter of the second conference site is F865, and the parameter represents that the light source type of the second conference site is a fluorescent lamp, the color rendering index is 80 to 89, and the color temperature is 6,500 K; that is, in the environmental parameter, F represents that the light source type is a fluorescent lamp, a unit of the color rendering index is 10, and a unit of the color temperature is 100 K.

In addition, if a light source of the environment of the second conference site is a standard light source stipulated by the CIE (Commission Internationale de L'Eclairage, Commission Internationale de L'Eclairage), values of the color temperature and the color rendering index can be obtained only according to the light source type of the standard light source stipulated by the CIE. Therefore, in this situation, the environmental parameter of the second conference site may include only the information about the light source type. For example, the environmental parameter of the second conference site is A, and the parameter represents that the color temperature of the environment of the second conference site is 2,856 K, the color rendering index is greater than 95, and the light source type is an incandescent lamp. Note that, the order of performing step 501 and step 502 is not limited.

Step 503: The remote processing device receives and saves the environmental parameter of the first conference site and the environmental parameter of the second conference site.

Here, after receiving the environmental parameter of the first conference site and the environmental parameter of the second conference site, the remote processing device stores the received environmental parameter of the first conference site and the received environmental parameter of the second conference site. In this way, the presence terminal of the first conference site may not send the environmental parameter of the first conference site to the remote processing device again in a process of subsequent communication with the remote processing device, and the presence terminal of the second conference site also may not send the environmental parameter of the second conference site to the remote processing device again in a process of subsequent communication with the remote processing device; and when needing to use the environmental parameter of the first conference site and the environmental parameter of the second conference site, the remote processing device may directly use the stored environmental parameter of the first conference site and the stored environmental parameter of the second conference site. This can reduce the load of information bearing between the presence terminal of the first conference site and the remote processing device and that between the presence terminal of the second conference site and the remote processing device, thereby increasing a speed of information interaction between the presence terminal of the first conference site and the remote processing device and that between the presence terminal of the second conference site and the remote processing device to a certain extent.

Certainly, when the environmental parameter of the second conference site and/or the environmental parameter of the first conference site changes, the presence terminal of the second conference site and/or the presence terminal of the first conference site re-sends the changed environmental parameter of the second conference site and/or the changed environmental parameter of the first conference site to the remote processing device, respectively; and after receiving the changed environmental parameter of the second conference site and/or the changed environmental parameter of the first conference site, the remote processing device updates its stored environmental parameter of the second conference site and/or its stored environmental parameter of the first conference site according to the changed environmental parameter of the second conference site and/or the changed environmental parameter of the first conference site, thereby ensuring that the environmental parameter of the second conference site that is stored by the remote processing device is consistent with an illumination characteristic of the environment of the second conference site and that the environmental parameter of the first conference site that is stored by the remote processing device is consistent with an illumination characteristic of the environment of the first conference site.

Step 504: The remote processing device acquires an image of the first conference site; specifically, the remote processing device receives the image of the first conference site that is captured and sent by the presence terminal of the first conference site.

Step 505: The remote processing device converts the image of the first conference site according to the pre-stored environmental parameter of the first conference site and the pre-stored environmental parameter of the second conference site to obtain a second image to be displayed that is consistent with the environmental parameter of the second conference site.

Specifically, information about an image conversion coefficient is looked up according to the environmental parameter of the first conference site and the environmental parameter of the second conference site. when a corresponding image conversion coefficient for converting the environmental parameter of the first conference site into the environmental parameter of the second conference site is obtained by looking up the information about the image conversion coefficient, the image of the first conference site is converted, according to the image conversion coefficient, into the second image to be displayed that is consistent with the environmental parameter of the second conference site.

The information about the image conversion coefficient includes the image conversion coefficient corresponding for converting the environmental parameter of the first conference site into the environmental parameter of the second conference site, and an image conversion coefficient for converting the environmental parameter of the second conference site into the environmental parameter of the first conference site. Specifically, the image conversion coefficient may include information such as a color transformation matrix, for example, a transformation matrix on RGB color space, a transformation matrix on RGB to YUV (Y is a brightness signal of an image, U is a color difference signal indicating a tendency to red of an image, and V is a color difference signal indicating a tendency to blue of an image) color space, and the like, RGB/YUV gains, a 3D-LUT (three-dimensional color space interpolation) lookup table, a Gamma table, and a white balance parameter or a black balance parameter.

For example, when the image conversion coefficient is a color transformation matrix, the converting, according to the image conversion coefficient, the image of the first conference site into the second image to be displayed that is consistent with the environmental parameter of the second conference site includes: multiplying the color transformation matrix by a color value of each pixel in the image of the first conference site to obtain the converted second image to be displayed that is consistent with the environmental parameter of the second conference site. A specific calculation process is the same as the calculation manner of multiplying the color transformation matrix by a color value of each pixel in the image of the second conference site to obtain the first image to be displayed in step 303, detailed description about a method for acquiring the color transformation matrix is also provided in step 303, and therefore no further details are provided herein.

For example, when the image conversion coefficient is a three-dimensional color space interpolation lookup table, the converting, according to the image conversion coefficient, the image of the first conference site into the second image to be displayed that is consistent with the environmental parameter of the second conference site includes:

obtaining an output color value corresponding to a color value of each pixel in the image of the first conference site according to the three-dimensional color space interpolation lookup table, where the output color value corresponding to the color value of each pixel in the image of the first conference site forms the second image to be displayed that is consistent with the environmental parameter of the second conference site, where:

the obtaining an output color value corresponding to a color value of each pixel in the image of the first conference site according to the three-dimensional color space interpolation lookup table includes: successively using the color value of each pixel in the image of the first conference site as a color value of a current pixel to be looked up to perform the following operations:

looking up the three-dimensional color space interpolation lookup table according to the color value of the current pixel to be looked up; and when an output color value corresponding to the color value of the current pixel to be looked up fails to be obtained by looking up the three-dimensional color space interpolation lookup table, calculating and obtaining, by using an interpolation algorithm according to multiple output color values adjacent to the color value of the current pixel to be looked up in the three-dimensional color space interpolation lookup table, an output color value corresponding to the color value of the current pixel to be looked up.

The used interpolation algorithm may be an algorithm such as a three-dimensional linear interpolation or three-dimensional Bessel interpolation algorithm.

Here, a method for generating a three-dimensional color space interpolation lookup table is similar to a method for generating a color transformation matrix; through an experimental method, an image of a color template may be shot in conference site conditions of the environmental parameter of the first conference site and the environmental parameter of the second conference site, respectively, and then a three-dimensional color space interpolation lookup table is generated by using a color set obtained through sampling.

Step 506: The remote processing device sends the second image to be displayed to the presence terminal of the second conference site, so that the presence terminal of the second conference site displays the second image to be displayed.

In addition, note that, in a specific implementation process of this embodiment, the following operations may further be included, and the foregoing operations may be performed in parallel with the following operations.

The presence terminal of the second conference site sends a captured image of the second conference site to the remote processing device, and the remote processing device receives the image of the second conference site; the remote processing device converts the image of the second conference site according to the environmental parameter of the first conference site and the environmental parameter of the second conference site to obtain a first image to be displayed that is consistent with the environmental parameter of the first conference site; and the remote processing device sends the first image to be displayed to the presence terminal of the first conference site, so that the presence terminal of the first conference site displays the first image to be displayed.

A specific processing method for converting the image of the second conference site according to the environmental parameter of the first conference site and the environmental parameter of the second conference site to obtain the first image to be displayed that is consistent with the environmental parameter of the first conference site is the same as the processing method, described in 303 of the method embodiment, for converting the image of the second conference site according to the environmental parameter of the first conference site and the environmental parameter of the second conference site to obtain the first image to be displayed that corresponds to the environmental parameter of the first conference site. No further details are provided herein.

Figure 6:
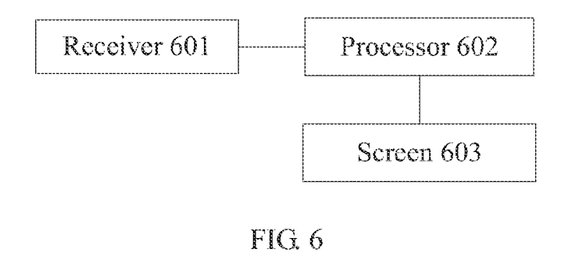
FIG. 6 is a structural diagram of one embodiment of a conference site presence terminal.

FIG. 6 is a structural diagram of one embodiment of a conference site presence terminal. The conference site presence terminal includes a receiver 601, a processor 602, and a screen 603. The receiver 601 is configured to receive an image of a second conference site and an environmental parameter of the second conference site that are sent by a presence terminal of the second conference site. The processor 602 is configured to convert the image of the second conference site according to a pre-stored environmental parameter of a first conference site and the environmental parameter of the second conference site to obtain a first image to be displayed that is consistent with the environmental parameter of the first conference site. The screen 603 is configured to display the first image to be displayed.

Figure 7:
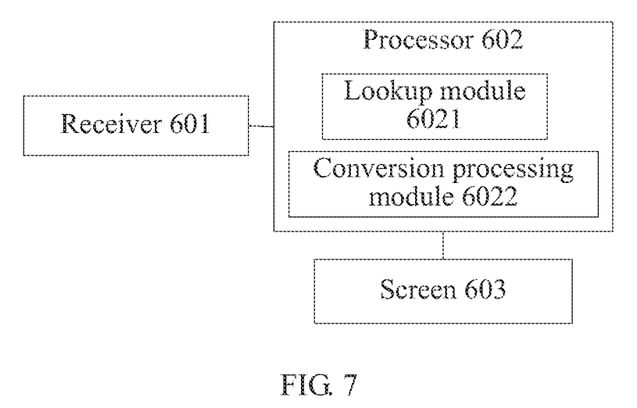
FIG. 7 is a structural diagram of another embodiment of a conference site presence terminal.

FIG. 7 is a structural diagram of the conference site presence terminal embodiment of FIG. 6. Processor 602 includes: a lookup module 6021, configured to look up information about an image conversion coefficient according to the pre-stored environmental parameter of the first conference site and the environmental parameter of the second conference site, and a conversion processing module 6022, configured to: when a corresponding image conversion coefficient for converting the environmental parameter of the second conference site into the environmental parameter of the first conference site is obtained by looking up the information about the image conversion coefficient, convert, according to the image conversion coefficient, the image of the second conference site into the first image to be displayed that is consistent with the environmental parameter of the first conference site.

When the image conversion coefficient obtained through lookup by the lookup module 6021 is a color transformation matrix, the conversion processing module 6022 is specifically configured to multiply the color transformation matrix by a color value of each pixel in the image of the second conference site to obtain the converted first image to be displayed that is consistent with the environmental parameter of the first conference site.

When the image conversion coefficient obtained through lookup by the lookup module 6021 is a three-dimensional color space interpolation lookup table, the conversion processing module 6022 is specifically configured to obtain an output color value corresponding to a color value of each pixel in the image of the second conference site according to the three-dimensional color space interpolation lookup table, where the output color value corresponding to the color value of each pixel in the image of the second conference site forms the first image to be displayed that is consistent with the environmental parameter of the first conference site. The conversion processing module 6022 specifically includes: a first processing unit, configured to successively use the color value of each pixel in the image of the second conference site as a color value of a current pixel to be looked up and instruct a lookup unit to start working; the lookup unit, configured to look up the three-dimensional color space interpolation lookup table according to the color value of the current pixel to be looked up; and a calculating unit, configured to: when an output color value corresponding to the color value of the current pixel to be looked up fails to be obtained by looking up the three-dimensional color space interpolation lookup table, calculate and obtain, by using an interpolation algorithm according to multiple output color values adjacent to the color value of the current pixel to be looked up in the three-dimensional color space interpolation lookup table, an output color value corresponding to the color value of the current pixel to be looked up.

Figure 8:
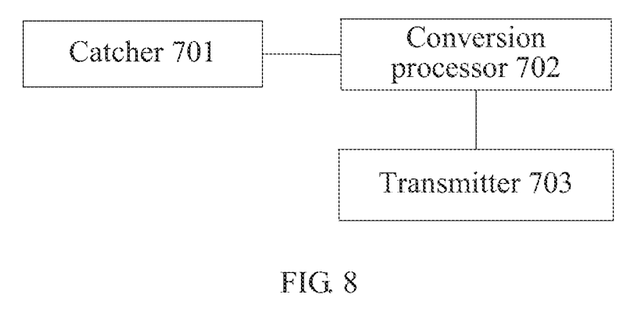
FIG. 8 is a structural diagram of one embodiment of an apparatus for adjusting image display.

FIG. 8 is a structural diagram of one embodiment of an apparatus for adjusting image display. The apparatus for adjusting image display includes a catcher 701, a conversion processor 702, and a transmitter 703. The catcher 701 is configured to acquire an image of a first conference site. The conversion processor 702 is configured to convert the image of the first conference site according to a pre-stored environmental parameter of the first conference site and an environmental parameter of a second conference site to obtain a second image to be displayed that is consistent with the environmental parameter of the second conference site. The transmitter 703 is configured to send the second image to be displayed to a presence terminal of the second conference site, so that the presence terminal of the second conference site displays the second image to be displayed.

Figure 9:
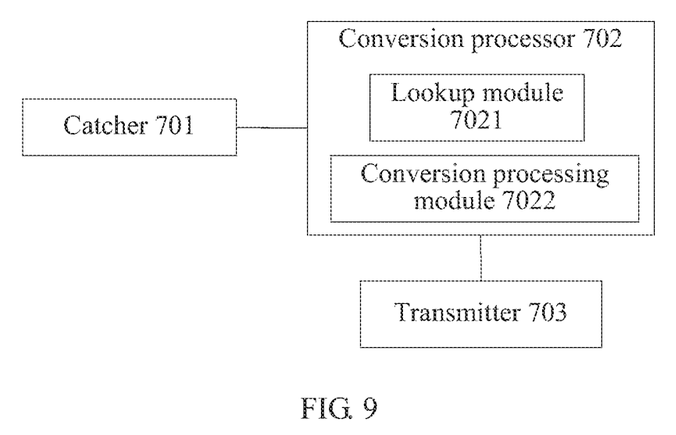
FIG. 9 is a structural diagram of another embodiment of an apparatus for adjusting image display.

FIG. 9 is a structural diagram of the apparatus embodiment of FIG. 8. The conversion processor 702 in this embodiment includes: a lookup module 7021, configured to look up information about an image conversion coefficient according to the environmental parameter of the first conference site and the environmental parameter of the second conference site; and a conversion processing module 7022, configured to: when a corresponding image conversion coefficient for converting the environmental parameter of the first conference site into the environmental parameter of the second conference site is obtained by looking up the information about the image conversion coefficient, convert, according to the image conversion coefficient, the image of the first conference site into the second image to be displayed that is consistent with the environmental parameter of the second conference site.

When the image conversion coefficient obtained through lookup by the lookup module 7021 is a color transformation matrix, the conversion processing module 7022 is specifically configured to multiply the color transformation matrix by a color value of each pixel in the image of the first conference site to obtain the converted second image to be displayed that is consistent with the environmental parameter of the second conference site.

When the image conversion coefficient obtained through lookup by the lookup module 7021 is a three-dimensional color space interpolation lookup table, the conversion processing module 7022 is specifically configured to obtain an output color value corresponding to a color value of each pixel in the image of the first conference site according to the three-dimensional color space interpolation lookup table, where the output color value corresponding to the color value of each pixel in the image of the first conference site forms the second image to be displayed that is consistent with the environmental parameter of the second conference site. The conversion processing module 7022 includes: a processing unit, configured to successively use the color value of each pixel in the image of the first conference site as a color value of a current pixel to be looked up and instruct a lookup unit to start working; the lookup unit, configured to look up the three-dimensional color space interpolation lookup table according to the color value of the current pixel to be looked up; and a calculating unit, configured to: when an output color value corresponding to the color value of the current pixel to be looked up fails to be obtained by looking up the three-dimensional color space interpolation lookup table, calculate and obtain, by using an interpolation algorithm according to multiple output color values adjacent to the color value of the current pixel to be looked up in the three-dimensional color space interpolation lookup table, an output color value corresponding to the color value of the current pixel to be looked up.

Figure 10:
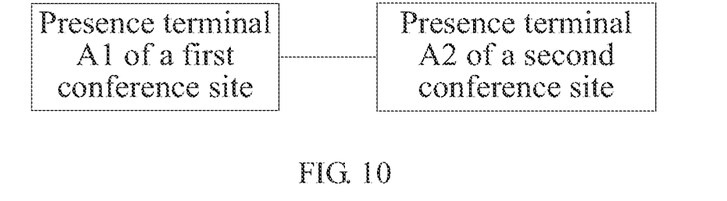
FIG. 10 is a schematic diagram of one embodiment of a system for adjusting image display.

FIG. 10 is a schematic diagram of one embodiment of a system for adjusting image display. The system includes a presence terminal A1 of a first conference site and a presence terminal A2 of a second conference site. The presence terminal A2 of the second conference site is configured to capture an image of the second conference site and send the captured image of the second conference site and a pre-stored environmental parameter of the second conference site to the presence terminal of the first conference site. The presence terminal A1 of the first conference site is configured to receive the image of the second conference site and the environmental parameter of the second conference site that are sent by the presence terminal A2 of the second conference site, convert the image of the second conference site according to a pre-stored environmental parameter of the first conference site and the environmental parameter of the second conference site to obtain a first image to be displayed that is consistent with the environmental parameter of the first conference site, and display the first image to be displayed.

Specifically, the structure of the presence terminal A1 of the first conference site is the same as the structure of the conference site presence terminal embodiment of FIG. 6.

Figure 11:
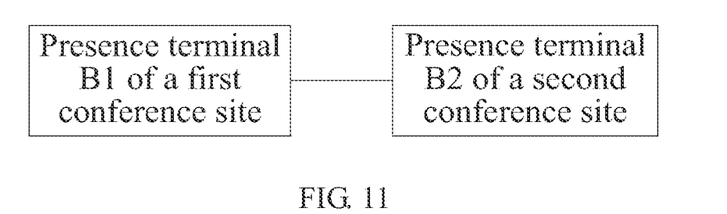
FIG. 11 is a schematic diagram of another embodiment of a system for adjusting image display.

FIG. 11 is a schematic diagram of one embodiment of a system for adjusting image display. The system includes a presence terminal B1 of a first conference site and a presence terminal B2 of a second conference site. The presence terminal B1 of the first conference site is configured to acquire an image of the first conference site, convert the image of the first conference site according to a pre-stored environmental parameter of the first conference site and an environmental parameter of the second conference site to obtain a second image to be displayed that is consistent with the environmental parameter of the second conference site, and then send the second image to be displayed to the presence terminal B2 of the second conference site. The presence terminal B2 of the second conference site is configured to display the second image to be displayed.

The structure of the presence terminal B1 of the first conference site is specifically the same as the structure of the apparatus for adjusting image display embodiment of FIG. 8.

Figure 12:
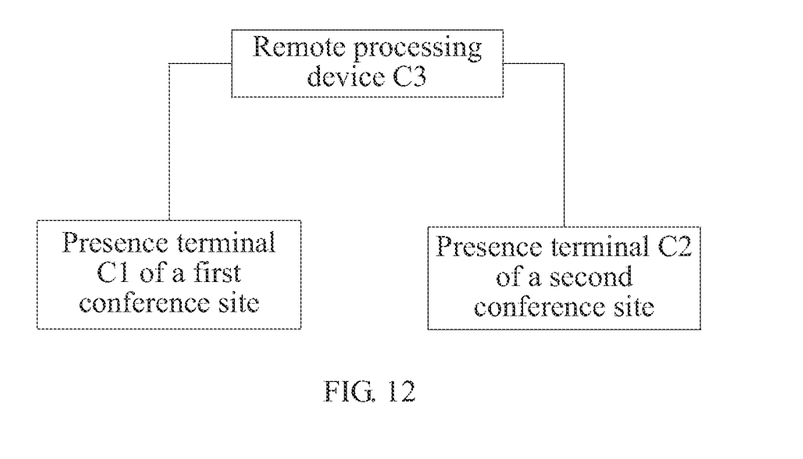
FIG. 12 is a schematic diagram of yet another embodiment of a system for adjusting image display.

FIG. 12 is a schematic diagram of one embodiment of a system for adjusting image display. The system includes a presence terminal C1 of a first conference site, a presence terminal C2 of a second conference site, and a remote processing device C3. The presence terminal C1 of the first conference site is configured to capture an image of the first conference site and send the captured image of the first conference site to the remote processing device C3. The remote processing device C3 is configured to receive the image of the first conference site, convert the image of the first conference site according to a pre-stored environmental parameter of the first conference site and an environmental parameter of the second conference site to obtain a second image to be displayed that is consistent with the environmental parameter of the second conference site, and then send the second image to be displayed to the presence terminal C2 of the second conference site. The presence terminal C2 of the second conference site is configured to display the second image to be displayed.

Specifically, the structure of the remote processing device C3 is the same as the structure of the apparatus for adjusting image display embodiment of FIG. 8.

Through the foregoing description of the embodiments, it is clear to a person skilled in the art that, the present invention may be implemented by software plus necessary universal hardware, and definitely may also be implemented by hardware, but in many cases, the former is preferred. Based on such an understanding, the technical solutions of the present invention essentially, or the part contributing to the prior art may be implemented in a form of a software product. The computer software product is stored in a readable storage medium, for example, a floppy disk, a hard disk, or an optical disk of the computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for adjusting image display, the method comprising:
receiving an image of a second conference site and an environmental parameter of the second conference site, sent by a presence terminal of the second conference site;
converting the image of the second conference site according to a pre-stored environmental parameter of a first conference site and the environmental parameter of the second conference site to obtain an image for display, wherein a conference site environmental parameter of the image for display is consistent with the environmental parameter of the first conference site; and
displaying the image for display.

2. The method of claim 1, wherein the converting comprises:
looking up information about an image conversion coefficient according to the pre-stored environmental parameter of the first conference site and the environmental parameter of the second conference site, thereby obtaining a corresponding image conversion coefficient for converting the environmental parameter of the second conference site into the environmental parameter of the first conference site; and
converting the image of the second conference site into the image for display according to the corresponding image conversion coefficient.

3. The method of claim 2, wherein the image conversion coefficient is a color transformation matrix and the converting includes multiplying the color transformation matrix by a color value of each pixel in the image of the second conference site to obtain the image for display.

4. The method of claim 2, wherein the image conversion coefficient is a three-dimensional color space interpolation lookup table and the converting includes obtaining an output color value corresponding to a color value of each pixel in the image of the second conference site according to the three-dimensional color space interpolation lookup table, wherein the output color value corresponding to the color value of each pixel in the image of the second conference site forms the image for display,
wherein the obtaining includes successively using the color value of each pixel in the image of the second conference site as a color value of a current pixel to be looked up for:
looking up the three-dimensional color space interpolation lookup table according to the color value of the current pixel to be looked up; and
using an interpolation algorithm according to multiple output color values adjacent to the color value of the current pixel to be looked up in calculating and obtaining an output color value corresponding to the color value of the current pixel to be looked up, when the output color value corresponding to the color value of the current pixel to be looked up fails to be obtained by looking up the three-dimensional color space interpolation lookup table.

5. A method for adjusting image display, comprising:
acquiring an image of a first conference site;
converting the image of the first conference site according to a pre-stored environmental parameter of the first conference site and an environmental parameter of a second conference site to obtain an image for display, wherein a conference site environmental parameter of the image for display is consistent with the environmental parameter of the second conference site; and
sending the image for display to a presence terminal of the second conference site for display.

6. The method of claim 5, wherein the converting includes:
looking up information about an image conversion coefficient according to the environmental parameter of the first conference site and the environmental parameter of the second conference site, thereby obtaining a corresponding image conversion coefficient for converting the environmental parameter of the first conference site into the environmental parameter of the second conference site; and
converting the image of the first conference site into the image for display according to the image conversion coefficient.

7. The method of claim 6, wherein the image conversion coefficient is a color transformation matrix and the converting includes multiplying the color transformation matrix by a color value of each pixel in the image of the first conference site to obtain the image for display.

8. The method of claim 6, wherein the image conversion coefficient is a three-dimensional color space interpolation lookup table and the converting includes obtaining an output color value corresponding to a color value of each pixel in the image of the first conference site according to the three-dimensional color space interpolation lookup table, wherein the output color value corresponding to the color value of each pixel in the image of the first conference site forms the image for display, wherein the obtaining includes successively using the color value of each pixel in the image of the first conference site as a color value of a current pixel to be looked up for:

looking up the three-dimensional color space interpolation lookup table according to the color value of the current pixel to be looked up; and using an interpolation algorithm according to multiple output color values adjacent to the color value of the current pixel to be looked up in the three-dimensional color space interpolation lookup table in calculating and obtaining an output color value corresponding to the color value of the current pixel to be looked up, when the output color value corresponding to the color value of the current pixel to be looked up fails to be obtained by looking up the three-dimensional color space interpolation lookup table.

9. A conference site presence terminal, comprising:

a receiver configured to receive an image of a second conference site and an environmental parameter of the second conference site, sent by a presence terminal of the second conference site;

a processor configured to convert the image of the second conference site according to a pre-stored environmental parameter of a first conference site and the environmental parameter of the second conference site to obtain an image for display, wherein a conference site environmental parameter of the image for display is consistent with the environmental parameter of the first conference site; and a screen configured to display the image for display.

10. The conference site presence terminal of claim 9, wherein the processor comprises:

a lookup module configured to look up information about an image conversion coefficient according to the pre-stored environmental parameter of the first conference site and the environmental parameter of the second conference site to obtain a corresponding image conversion coefficient for converting the environmental parameter of the second conference site into the environmental parameter of the first conference site; and a conversion processing module configured to convert the image of the second conference site into the image for display according to the corresponding image conversion coefficient.

11. The conference site presence terminal of claim 10, wherein when the corresponding image conversion coefficient is a color transformation matrix and the conversion processing module is further configured to multiply the color transformation matrix by a color value of each pixel in the image of the second conference site to obtain the image for display.

12. The conference site presence terminal of claim 10, wherein when the corresponding image conversion coefficient is a three-dimensional color space interpolation lookup table and the conversion processing module is further configured to obtain an output color value corresponding to a color value of each pixel in the image of the second conference site according to the three-dimensional color space interpolation lookup table, wherein the output color value corresponding to the color value of each pixel in the image of the second conference site forms the image for display, wherein the conversion processing module comprises:

a lookup unit configured to look up the three-dimensional color space interpolation lookup table according to a color value of a current pixel to be looked up;

a first processing unit configured to successively use the color value of each pixel in the image of the second conference site as the color value of the current pixel to be looked up and instruct the lookup unit to start working; and a calculating unit configured to use an interpolation algorithm according to multiple output color values adjacent to the color value of the current pixel to be looked up to calculate and obtain an output color value corresponding to the color value of the current pixel to be looked up, when the output color value corresponding to the color value of the current pixel to be looked up fails to be obtained by looking up the three-dimensional color space interpolation lookup table.

13. An apparatus for adjusting image display, comprising:

a catcher configured to acquire an image of a first conference site;

a conversion processor configured to convert the image of the first conference site according to a pre-stored environmental parameter of the first conference site and an environmental parameter of a second conference site to obtain an image for display, wherein a conference site environmental parameter of the image for display is consistent with the environmental parameter of the second conference site; and a transmitter configured to send the image for display toward a presence terminal of the second conference site for display.

14. The apparatus of claim 13, wherein the conversion processor comprises:

a lookup module configured to look up information about an image conversion coefficient according to the environmental parameter of the first conference site and the environmental parameter of the second conference site to obtain a corresponding image conversion coefficient for converting the environmental parameter of the first conference site into the environmental parameter of the second conference site; and a conversion processing module configured to convert the image of the first conference site into the image for display according to the image conversion coefficient.

15. The apparatus of claim 14, wherein when the corresponding image conversion coefficient is a color transformation matrix and the conversion processing module is further configured to multiply the color transformation matrix by a color value of each pixel in the image of the first conference site to obtain the image for display.

16. The apparatus of claim 14, wherein the corresponding image conversion coefficient is a three-dimensional color space interpolation lookup table and the conversion processing module is further configured to obtain an output color value corresponding to a color value of each pixel in the image of the first conference site according to the three-dimensional color space interpolation lookup table, wherein the output color value corresponding to the color value of each pixel in the image of the first conference site forms the image for display.

17. The apparatus of claim 16, wherein the conversion processing module comprises:

a lookup unit configured to look up the three-dimensional color space interpolation lookup table according to a color value of a current pixel to be looked up;

a processing unit configured to successively use the color value of each pixel in the image of the first conference site as the color value of a current pixel to be looked up and instruct the lookup unit to start working; and a calculating unit configured to use an interpolation algorithm according to multiple output color values adjacent to the color value of the current pixel to be looked up to calculate and obtain an output color value corresponding to the color value of the current pixel to be looked up, when the output color value corresponding to the color value of the current pixel to be looked up fails to be obtained by looking up the three-dimensional color space interpolation lookup table.

18. A system for adjusting image display, comprising:

a presence terminal of a first conference site; and a presence terminal of a second conference site configured to capture an image of the second conference site and send the captured image of the second conference site and a pre-stored environmental parameter of the second conference site to the presence terminal of the first conference site, wherein the presence terminal of the first conference site is configured to:
- receive the image of the second conference site and the environmental parameter of the second conference site,
- convert the image of the second conference site according to a pre-stored environmental parameter of the first conference site and the environmental parameter of the second conference site to obtain an image for display, wherein a conference site environmental parameter of the image for display is consistent with the environmental parameter of the first conference site, and
- display the image for display.

19. A system for adjusting image display, comprising:

a presence terminal of a second conference site configured to display an image for display; and a presence terminal of a first conference site configured to:
- acquire an image of the first conference site,
- convert the image of the first conference site according to a pre-stored environmental parameter of the first conference site and an environmental parameter of the second conference site to obtain an image for display, wherein a conference site environmental parameter of the image for display is consistent with the environmental parameter of the second conference site, and
- send the image for display to the presence terminal of the second conference site.

20. A system for adjusting image display, comprising:

a presence terminal of a second conference site configured to display an image for display;

a presence terminal of a first conference site configured to capture an image of the first conference site; and a remote processing device configured to:
- receive the image of the first conference site from the presence terminal of the first conference site,
- convert the image of the first conference site according to a pre-stored environmental parameter of the first conference site and an environmental parameter of the second conference site to obtain an image for display, wherein a conference site environmental parameter of the image for display is consistent with the environmental parameter of the second conference site, and
- send the image for display to the presence terminal of the second conference site.

* * * * *